(12) United States Patent
Zhang

(10) Patent No.: US 8,579,387 B2
(45) Date of Patent: Nov. 12, 2013

(54) GLOVE BOX

(75) Inventor: Delong Zhang, Jiangsu (CN)

(73) Assignee: Vigor Gas Separation Equipment Technologies (SIP) Co., Ltd., Shuzhou, Jiangsu (CN)

( * ) Notice: Subject to any disclaimer, the term of this patent is extended or adjusted under 35 U.S.C. 154(b) by 468 days.

(21) Appl. No.: 12/746,471

(22) PCT Filed: Nov. 20, 2008

(86) PCT No.: PCT/CN2008/001891
§ 371 (c)(1),
(2), (4) Date: Jun. 4, 2010

(87) PCT Pub. No.: WO2009/079908
PCT Pub. Date: Jul. 2, 2009

(65) Prior Publication Data
US 2010/0259138 A1   Oct. 14, 2010

(30) Foreign Application Priority Data
Dec. 12, 2007   (CN) .......................... 2007 1 0191501

(51) Int. Cl.
*B25J 21/02* (2006.01)
(52) U.S. Cl.
USPC .............................................. 312/1; 312/296
(58) Field of Classification Search
USPC ............. 49/477.1; 52/171.3; 312/1, 114, 296; 277/913, 921, 928
See application file for complete search history.

(56) References Cited

U.S. PATENT DOCUMENTS

| 2,527,084 A * | 10/1950 | Smith .......................... 220/232 |
| 3,050,791 A * | 8/1962 | Trexler ........................... 49/463 |
| 3,088,627 A * | 5/1963 | Saunders .......................... 312/1 |
| 3,124,852 A * | 3/1964 | Holderer ..................... 49/477.1 |
| 3,501,868 A * | 3/1970 | Ganzinotti .................. 49/477.1 |
| 3,694,962 A * | 10/1972 | McDonald et al. .......... 49/477.1 |
| 3,831,950 A * | 8/1974 | Bentley et al. ............... 277/649 |
| 4,089,571 A * | 5/1978 | Landy ............................... 312/1 |
| 4,111,753 A * | 9/1978 | Folsom et al. ..................... 435/3 |
| 4,469,335 A * | 9/1984 | Moore .......................... 277/648 |
| 5,950,642 A * | 9/1999 | Auck et al. .................. 134/22.1 |
| 6,974,197 B1 * | 12/2005 | Henry et al. ...................... 312/1 |
| 7,780,248 B2 * | 8/2010 | Granadino ........................ 312/1 |

FOREIGN PATENT DOCUMENTS

| CN | 2653228 | 11/2004 |
| EP | 1486265 | 12/2004 |

* cited by examiner

*Primary Examiner* — Janet M Wilkens
(74) *Attorney, Agent, or Firm* — Shaukat A. Karjeker; Colin P. Cahoon; Carstens & Cahoon, LLP

(57) ABSTRACT

A glove box with a leakage shielding space (4) comprises a main box body, a view window (8) placed on the main box body, glove ports installed on the view window (8), side panels attached to the main box body, and an antechamber (1) installed on a side panel. Wherein, on at least one of five interfaces, namely, between the main box body and the view window (8), between the main box body and the side panel, between the view window (8) and the glove port, between the glove port and the glove, between the side panel and the antechamber (1), a leakage shielding space (4) is formed, so as to ensure the purity in the operating space of the glove box and to prevent the external environment of the box body from being polluted.

2 Claims, 6 Drawing Sheets

GLOVE BOX

TECHNICAL FIELD

The present invention relates to a glove box and especially to a glove box with leakage shielding space, belonging to the technical field of a glove box system.

BACKGROUND OF THE INVENTION

In the process of scientific research and production, some materials are sensitive to one certain or several active compositions in air, such as oxygen, moisture, carbon dioxide and so on, and thus these research and production should be done in a sealed space filled with inert gases. On the other hand, some materials, which could be harmful to the operators if they are exposed to, should be dealt with in a sealed environment. A glove box, which can be made of metals or plastics, is a typical example of this like device, including a main box body having multiple openings equipped thereon with a view window, an antechamber, glove ports and so on. Operators operate the materials and devices inside the box body through a glove, and the antechamber is used for transferring materials and devices into and out of the glove box.

Existing glove boxes have leakage issues, and it is difficult to keep the respective contents of impurities (such as moisture, oxygen) inside the glove box less than 1 ppm (parts per million), even if the glove box is filled with high purity gas. The contents of moisture and oxygen will rise gradually during the use of the glove box, which makes the contents of moisture and oxygen inside the glove box much higher than what is required.

Specifically, there are following three main reasons why the contents of moisture and oxygen could rise:

1) Air can leak into the glove box through tiny gaps. The interfaces between the main box body and the view window, and between the glove and the glove port are normally sealed with rubber sealing rings, and there always exist tiny gaps around the sealing rings.

2) The oxygen and moisture in air can permeate into the glove box through the glove and the sealing rings. The glove and sealing rings are all rubber products, air can permeate slowly into the glove box through the rubber glove and rubber sealing rings.

3) When materials and devices are transferred into the glove box from outside, a small of amount of moisture and oxygen will be taken into as well. All materials can adsorb oxygen and moisture. Even though those materials have been evacuated in the antechamber before being transferred into the glove box, as shown in FIG. 1, remaining moisture and oxygen in the materials can only be removed very slowly by evacuation alone, and moisture and oxygen will be released gradually after the materials are transferred into the glove box.

And currently, to keep the respective contents of contaminants like oxygen and moisture less than 1 ppm, the glove box is normally equipped with a circulating purification system. As shown in FIG. 1, the system comprises a blower 2 and a purification column 3. The purification column 3 is filled with oxygen and moisture retaining materials. The impurity-containing gas is blown through the purification materials by the blower 2, and the oxygen and moisture are retained. The purified gas is then returned to the glove box. Continuous circulation like that will reduce the respective contents of oxygen and moisture to an equilibrium, namely that, the rate that oxygen and moisture leak into glove box is equal to the removing rate by the purification system. So that, the purity of gas inside the glove box is decided by both of the leak rate of the glove box and the efficiency of the purification system. In a word, the two key technologies in a glove box system are sealing and gas purification.

Currently, the sealing technology used in the glove box is the traditional sealing technology. As shown in FIG. 2, there is one layer of sealing material (such as a sealing ring 5, a sealing stripe, or a sealant) placed between two sealing surfaces. The inner side of the sealing material is ultra-high purity gas, and the outer side of the sealing material is air. Air has oxygen concentration of higher than 200,000 ppm and can easily leak into the glove box through tiny gaps to greatly affect the gas purity inside the box.

SUMMARY OF THE INVENTION

The purpose of the present invention is to provide a glove box to solve the above mentioned problems existing in the prior art.

The purpose of the present invention is achieved by the technical solution as follows:

A glove box comprises a main box body, a view window placed on the main box body, glove ports installed on the view window, side panels attached to the main box body, and an antechamber installed on the side panel; the main box body, the side panel, the glove ports and the antechamber have contact surfaces for contacting with sealing rings, characterized in that, on at least one of five interfaces, namely, between the main box body and the view window, between the main box body and the side panel, between the view window and the glove port, between the glove port and the glove, between the side panel and the antechamber, a leakage shielding space is formed.

Preferably, a drainage groove is created on any of the contact surfaces, and the sealing ring is fitted over the drainage groove, such that the leakage shielding space is formed between the drainage groove and the sealing ring.

Preferably, a drainage groove is created on any of the contact surfaces, also the sealing ring has a corresponding drainage groove, such that a leakage shielding space is formed between the drainage grooves.

Preferably, the sealing ring has a groove at each of its two contacting sides, such that, two leakage shielding spaces are formed between the grooves and the contact surfaces after the sealing ring is mounted.

Preferably, at least two sealing rings are used correspondingly on the contact surfaces, such that a leakage shielding space is formed between the sealing rings.

Preferably, a vacuum is created inside the leakage shielding space.

Preferably, flowing high purity gas, or gaseous substance harmless to materials inside the glove box and harmless to an operator outside the glove box, is filled inside the leakage shielding space.

The prominent substantive features and the notable progress of the present invention are as follows: By implementing the glove box of the present invention, a leakage shielding space can be formed between the main box body and the view window, or between the main box body and the side panel, or between the view window and the glove port, or between the glove port and the glove, or between the side panel and the antechamber, so as to ensure the purity in the operating space of the glove box and to effectively block the external contaminants from leaking inside due to the existence of gaps, so as to keep the moisture impurity less than 1 ppm and the oxygen impurity less than 1 ppm to maintain the degree of purity of gas. On the other hand, by implementing the glove box of the present invention, harmful substances inside the glove box will be blocked from leaking outwards due to the existence of gaps, so as to prevent the environment outside the glove box from being polluted. The present invention is easy to be implemented, and has made improvements in this technical field.

BRIEF DESCRIPTION OF THE DRAWINGS

The purpose, advantages and features of the present invention will be apparent from the following description of the preferred illustrative embodiments with reference to the accompanying drawings. These embodiments are typical examples of the technical solutions of the invention, but it will be apparent that substitutions or variations can be made without departing from the spirit and scope of the invention as defined in the claims. In the accompanying drawings:

Figure 1:
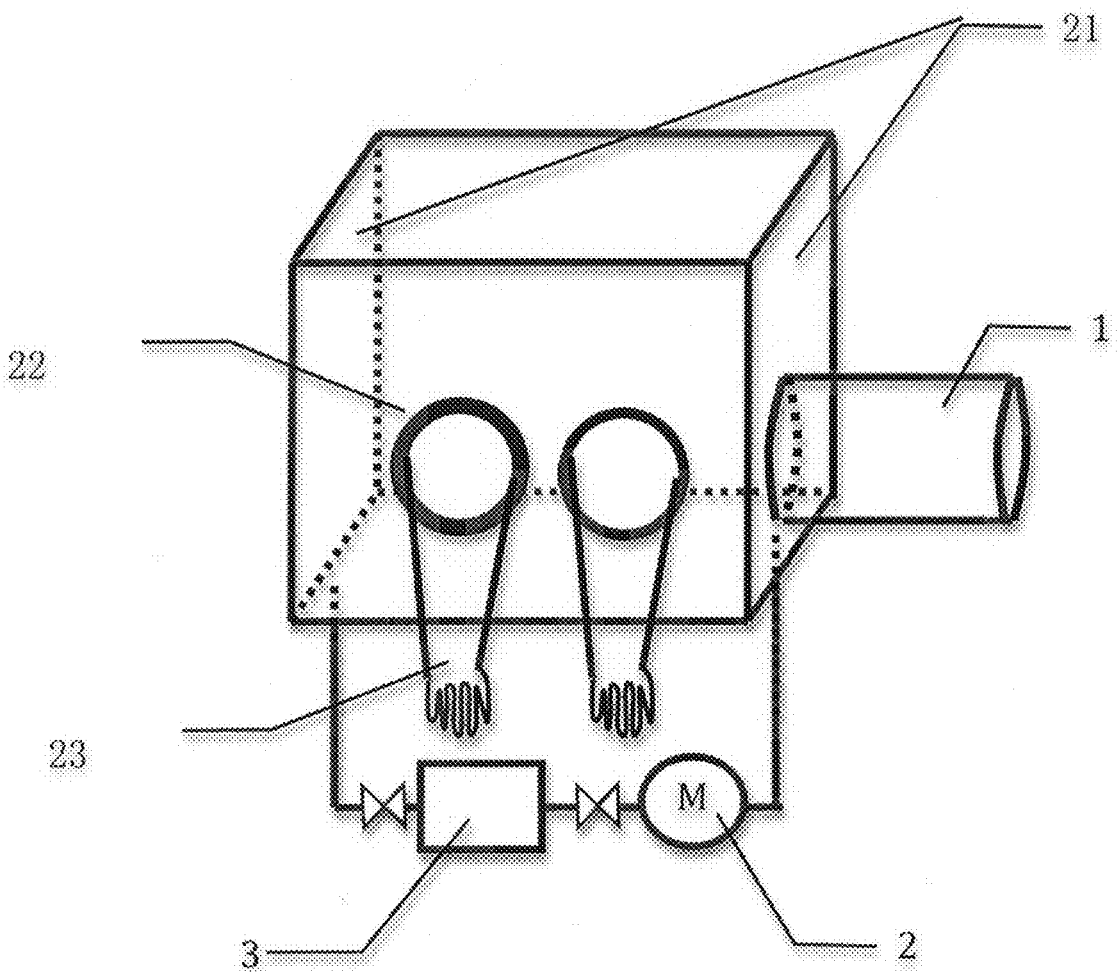
FIG. 1 is a schematic view illustrating the structure of the existing glove box.
Figure 2:
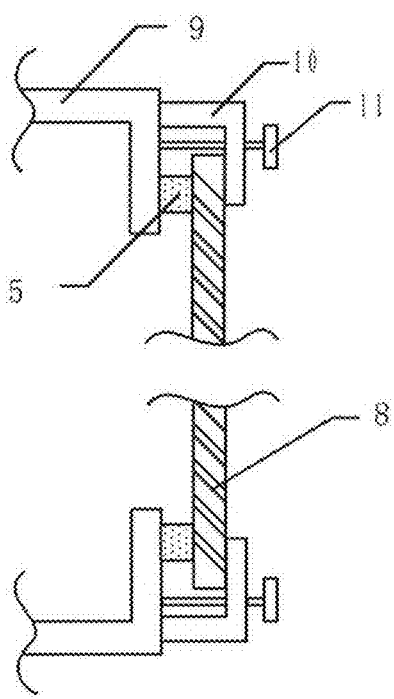
FIG. 2 is a schematic view illustrating the sealing technology of the existing glove box.

The elements in the drawings are denoted as follows:

| 1 | antechamber | 2 | blower |
|---|---|---|---|
| 3 | purification column | 4 | leakage shielding space |
| 5 | sealing ring | 6 | through hole |
| 7 | spacer | 8 | view window |
| 9 | inside edge of the main box body | 10 | holding strip |
| 11 | screw | | |

DETAILED DESCRIPTION OF THE PREFERRED EMBODIMENTS

As shown in FIGS. 3 to 8, the glove box comprises key components: a main box body, a view window placed on the main box body, glove ports on the view window, side panels, and an antechamber. The main body box, the side panel, the glove ports and the antechamber have contact surfaces sealed with sealing rings 5. Wherein, on at least one of five interfaces, namely, between the main box body and the view window, between the main box body and the side panel, between the view window and the glove port, between the glove port and the glove, between the side panel and the antechamber, is formed a leakage shielding space 4.

Specifically, a drainage groove is created on any of the contact surfaces, the sealing ring 5 is fitted over the drainage groove, such that the leakage shielding space 4 is formed between the drainage groove and the sealing ring 5. Alternatively, to enlarge the leakage shielding space 4, a drainage groove is created on a contact surface, also the sealing ring 5 has a corresponding drainage groove, such that a leakage shielding space 4 is formed between the two drainage grooves. Or the sealing ring 5 has a groove at each of its two contacting sides, such that, two leakage shielding spaces 4 are formed between in the grooves and the contact surfaces after the sealing ring 5 is mounted, so as to further ensure the shielding effect. Alternatively, at least two sealing rings 5 are used correspondingly on a contact surface, such that a leakage shielding space 4 is formed between the sealing rings 5.

Further to improve the shielding effect of the leakage shielding space 4, a vacuum is created in the leakage shielding space 4. Alternatively, the leakage shielding space 4 is filled with high purity gas, and the high purity gas is forced to flow continuously inside the leakage shielding space 4.

Embodiment 1

Figure 3:
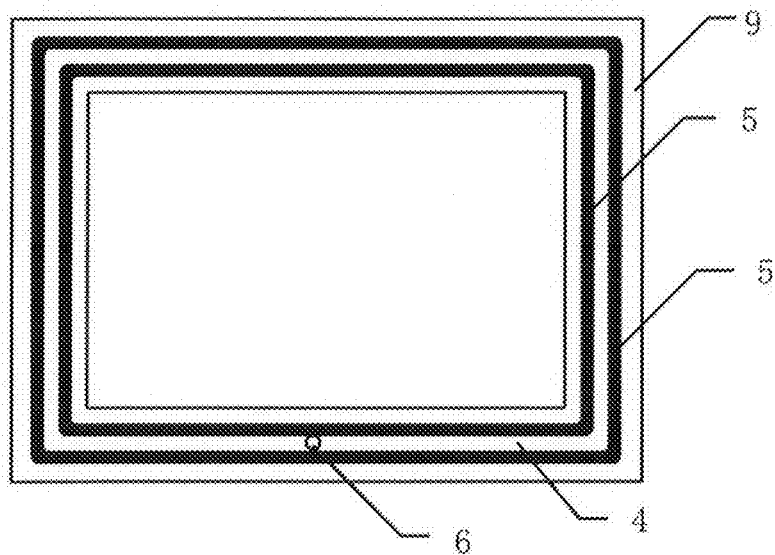
FIG. 3 is a schematic view illustrating the assembly of the main box body and the view window according to embodiment 1 of the present invention.
Figure 5:
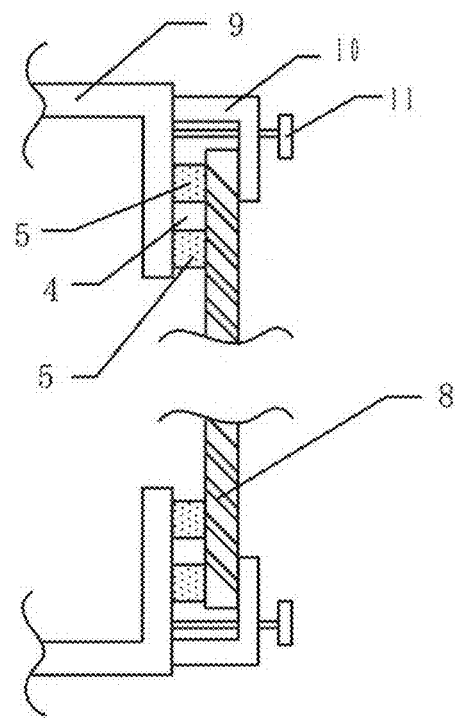
FIG. 5 is a side view illustrating the assembly of the main box body and the view window.
Figure 6:
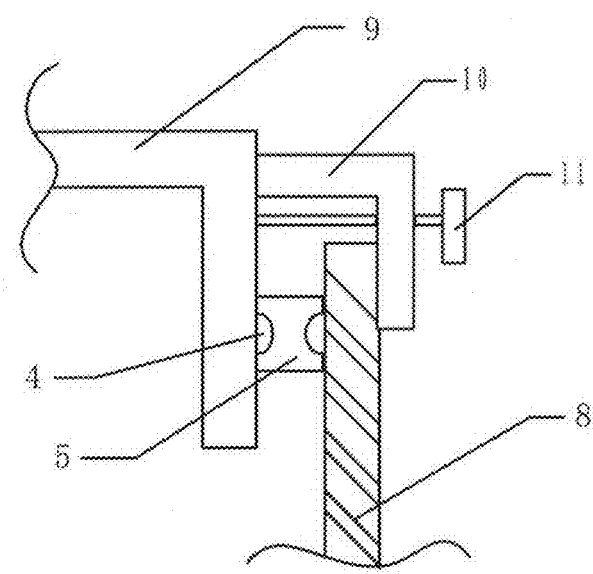
FIG. 6 is a schematic view illustrating the sealing ring having a groove at each of its two contacting sides.

As shown in FIG. 3 and FIG. 5, the opening of the main box body has an inside edge 9 at its periphery, and two concentric circular sealing rings 5 are placed on the inside edge 9, the view window 8 is fitted over the sealing rings 5. The two sealing rings 5, together with the inside edge 9 and the view window 8, form a leakage shielding space 4. Specifically, the view window 8 is made of glass or plastic, and is securely attached, at its periphery, to the main box body by a holding stripe 10 and screws 11. In a similar way, a leakage shielding space 4 can be formed between the main box body and the side panel, or between the view window and the glove port, or between the side panel and the antechamber. Of course, the connection between the main box body and the side panel, and the connection between the side panel and the antechamber, can be realized by welding as done traditionally, and a relatively tight sealing effect can be obtained.

As shown in FIG. 3, to further ensure the sufficient shielding of the leakage during the use of the glove box, a through hole 6 is opened to the leakage shielding space 4. The through hole 6 is connected to a vacuum pump to create a vacuum in the leakage shielding space 4 and to evacuate the possible contaminants leaked into the leakage shielding space 4, so as to prevent the contaminants from further leaking into the glove box.

Embodiment 2

Figure 4:
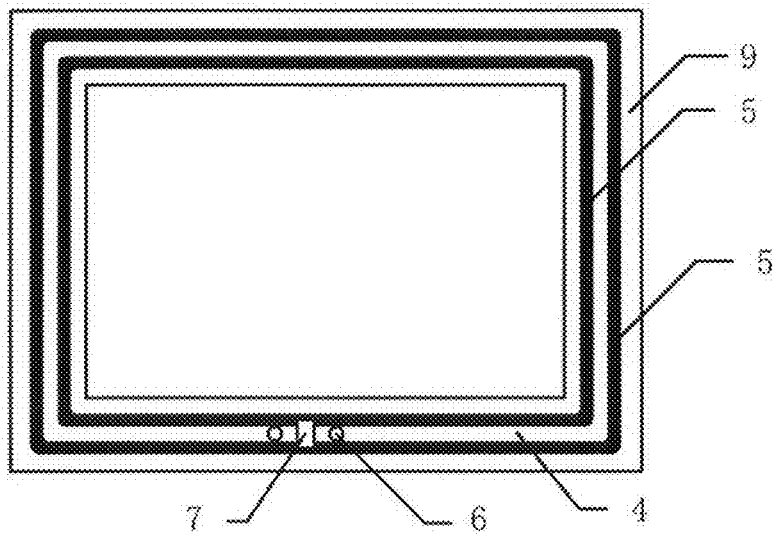
FIG. 4 is a schematic view illustrating the assembly of the main box body and the view window according to embodiment 2 of the present invention.

As shown in FIG. 4 and FIG. 5, the opening of the main box body has an inside edge 9 at its periphery, and two concentric circular sealing rings 5 are placed on the inside edge 9, the view window 8 is fitted over the sealing rings 5. The two sealing rings 5, together with the inside edge 9 and the view window 8, form a leakage shielding space 4. Specifically, the view window 8 is made of glass or plastic, and is securely attached, at its periphery, to the main box body by a holding stripe 10 and screws 11. In a similar way, a leakage shielding space 4 can be formed between the main box body and the side panel, or between the view window and the glove port, or between the side panel and the antechamber.

As shown in FIG. 4, to further ensure the leakage proof effect of the leakage shielding space during the use of the glove box, two through holes 6 are opened to the leakage shielding space 4, and the two through holes are separated by a spacer 7. Moreover, one of the through holes 6 is connected to a high purity gas source to purge the leakage shielding space 4. By means of the partition by the spacer 7, the high purity gas is full in the leakage shielding space 4, and is forced to flow orderly.

Embodiment 3

Figure 7:
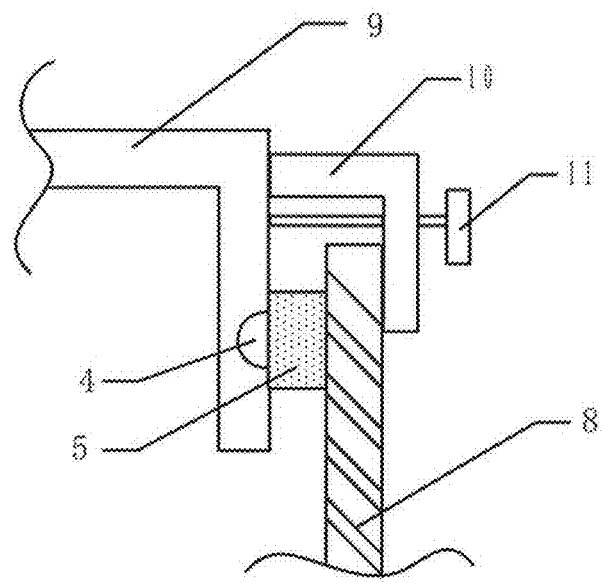
FIG. 7 and FIG. 8 are schematic views illustrating the assembly of the main box body and the view window according to embodiment 3 of the present invention.

As shown in FIG. 7, the main box body has, at its interface sealed with the sealing ring 5, a drainage groove, such that a leakage shielding space 4 is formed between the drainage groove and the sealing ring 5. Furthermore, in order to create a leakage shielding space on other interfaces of the main box body, the main box body and the side panel also have drainage grooves at their contact surface sealed with the sealing rings 5, such that a leakage shielding space 4 is formed between the drainage groove and the sealing ring 5. The glove port may also, on its contact surface with a glove mounted thereon, have a drainage groove, such that a leakage shielding space 4 is formed between the drainage groove and the glove. If the antechamber and the side panel of the glove box are not connected by conventional welding, the side panel and the antechamber may also have drainage grooves on their contact surfaces sealed with the sealing rings 5, such that a leakage shielding space 4 is formed between the drainage groove and the sealing ring 5.

Figure 8:
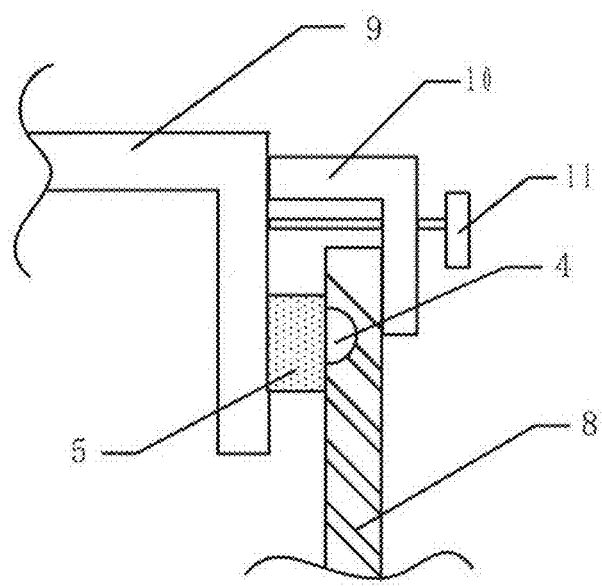

Alternatively, as shown in FIG. 8, a drainage groove is placed on the view window 8, also a leakage shielding space 4 can be formed between the drainage groove and the sealing ring 5.

Embodiment 4

Figure 9:
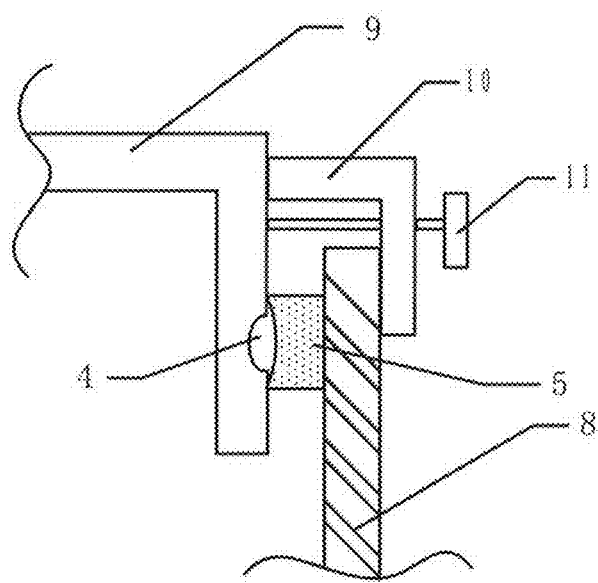
FIG. 9 is a schematic view illustrating the assembly of the main box body and the view window according to embodiment 4 of the present invention.

As shown in FIG. 9, the main box body and the view window 8 have respectively, at their contact surface sealed with the sealing ring 5, a drainage groove, also the sealing ring 5 has a corresponding drainage groove, such that a leakage shielding space 4 is formed between the drainage grooves. The assembling of other parts of the glove box is the same as that in Embodiment 3, and there is no need to go into details here.

It is apparent from the above description with reference to the accompanying drawings that: By implementing the glove box of the present invention, a leakage shielding space can be formed between the main box body and the view window 8, or between the main box body and the side panel, or between the view window 8 and the glove port, or between the glove port and the glove, or between the side panel and the antechamber, so as to ensure the purity in the operating space of the glove box and to effectively block the external contaminants from leaking inside due to the existence of gaps, so as to keep the moisture impurity less than 1 ppm and the oxygen impurity less than 1 ppm.

What is claimed is:

1. A glove box comprising a main box body, a view window placed on the main box body, glove ports installed on the view window, gloves attached to the glove ports, side panels attached to the main box body, and an antechamber installed on one of the side panels; the main box body, the side panels, the glove ports and the antechamber have contact surfaces sealed with sealing rings; on at least one of five interfaces, namely, between the main box body and the view window, between the main box body and the side panel, between the view window and the glove ports, between the side panels on which the antechamber is installed and the antechamber, between the glove ports and the gloves, characterized in that, a leakage shielding space is formed between the sealing rings, two through holes are opened to the leakage shielding space, and the two through holes are separated by a spacer, one of the through holes adapted to be connected to a high purity gas source and the other through hole serving as a vent to make the leakage shielding space full of flowing high purity gas.

2. A glove box comprising a main box body, a view window placed on the main box body, glove ports installed on the view window, gloves attached to the glove ports, side panels attached to the main box body, and an antechamber installed on one of the side panels; the main box body, the side panels, the glove ports and the antechamber have contact surfaces sealed with sealing rings; on at least one of five interfaces, namely, between the main box body and the view window, between the main box body and the side panels, between the view window and the glove port, between the side panel on which the antechamber is installed and the antechamber, between the glove ports and the gloves, characterized in that a leakage shielding space is formed between the sealing rings, a through hole is opened to the leakage shielding space, the through hole adapted to be connected to a vacuum pump to create a vacuum in the leakage shielding space.

* * * * *